(12) United States Patent
Gupta

(10) Patent No.: US 10,992,870 B1
(45) Date of Patent: *Apr. 27, 2021

(54) INTELLIGENT ZOOM METHOD AND VIDEO SYSTEM IMPLEMENTING SAME

(71) Applicant: Altia Systems Inc, Cupertino, CA (US)

(72) Inventor: Yashket Gupta, San Jose, CA (US)

(73) Assignee: ALTIA SYSTEMS, INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,529

(22) Filed: Nov. 4, 2019

Related U.S. Application Data

(63) Continuation of application No. 15/889,063, filed on Feb. 5, 2018, now Pat. No. 10,498,968.

(51) Int. Cl.
*H04N 5/232* (2006.01)
*H04N 5/225* (2006.01)
*G06K 9/32* (2006.01)
*G06T 7/11* (2017.01)

(52) U.S. Cl.
CPC ....... *H04N 5/23296* (2013.01); *G06K 9/3233* (2013.01); *H04N 5/2258* (2013.01); *H04N 5/23229* (2013.01); *G06T 7/11* (2017.01)

(58) Field of Classification Search
None
See application file for complete search history.

(56) References Cited

U.S. PATENT DOCUMENTS

| | | | |
|---|---|---|---|
| 8,045,047 B2 | 10/2011 | Nikkanen | |
| 8,908,057 B2 | 12/2014 | Yoshizumi | |
| 9,355,433 B1* | 5/2016 | Adsumilli | ............. G06T 3/0093 |
| 9,466,109 B1* | 10/2016 | Adsumilli | ............. H04N 5/247 |
| 10,498,968 B1* | 12/2019 | Gupta | .................. H04N 5/2628 |
| 2002/0122113 A1 | 9/2002 | Foote | |
| 2004/0027451 A1 | 2/2004 | Baker | |
| 2004/0179719 A1 | 9/2004 | Chen | |
| 2007/0092245 A1 | 4/2007 | Bazakos | |
| 2011/0310214 A1 | 12/2011 | Saleh | |
| 2012/0154545 A1* | 6/2012 | Choi | ......................... G06T 7/73 348/47 |
| 2013/0010084 A1 | 1/2013 | Hatano | |
| 2013/0021240 A1* | 1/2013 | Coulon | ............... G06F 21/6245 345/156 |

(Continued)

*Primary Examiner* — Cynthia Segura
(74) *Attorney, Agent, or Firm* — HM Law Group LLP; Vani Moodley, Esq.

(57) ABSTRACT

A video system is provided. The video system, comprising: a plurality of imaging sensors each including an image signal processor; an image stitching engine analyzes un-stitched images generated by each of the plurality of imaging sensors. The un-stitched images are analyzed for a presence of face and then divided into a plurality of zones. A mapping function is implemented for each of the plurality of zones based on a number of consecutive frames in which presence of a face is analyses and a minimum number of frames in which a face was detected. A zoom engine determines a region of interest which includes a left edge and a right edge, wherein said left edge is set based on coordinates associated with a face detected in a left most zone of the unstitched images, and said right edge is set based on coordinates associated with a right most face detected in a right most zone of the unstitched images.

13 Claims, 4 Drawing Sheets

(56) References Cited

U.S. PATENT DOCUMENTS

| | | | |
|---|---|---|---|
| 2013/0063596 A1 | 3/2013 | Ueda | |
| 2013/0108166 A1* | 5/2013 | Ptucha | G06T 11/60 |
| | | | 382/195 |
| 2014/0104378 A1* | 4/2014 | Kauff | H04N 5/247 |
| | | | 348/38 |
| 2014/0126819 A1 | 5/2014 | Doepke | |
| 2015/0109402 A1* | 4/2015 | Tian | H04N 5/23238 |
| | | | 348/14.07 |
| 2015/0124049 A1* | 5/2015 | Kimura | G03B 37/00 |
| | | | 348/39 |
| 2015/0130893 A1* | 5/2015 | Kimura | H04N 5/23216 |
| | | | 348/36 |
| 2017/0006219 A1* | 1/2017 | Adsumilli | H04N 5/23219 |
| 2017/0006220 A1* | 1/2017 | Adsumilli | H04N 5/247 |
| 2017/0140791 A1* | 5/2017 | Das | G06T 7/13 |
| 2018/0096449 A1* | 4/2018 | Racz | G06T 3/0012 |
| 2018/0270428 A1* | 9/2018 | Nose | G06K 9/00288 |
| 2018/0288311 A1 | 10/2018 | Baghert | |
| 2019/0362132 A1* | 11/2019 | Zhang | G06K 9/628 |
| 2020/0327653 A1* | 10/2020 | Leordeanu | G06T 7/194 |

\* cited by examiner

INTELLIGENT ZOOM METHOD AND VIDEO SYSTEM IMPLEMENTING SAME

This application is a continuation of U.S. patent application Ser. No. 15/889,063 entitled "INTELLIGENT ZOOM METHOD AND VIDEO SYSTEM IMPLEMENTING SAME" filed Feb. 5, 2018, which is incorporated herein by reference.

FIELD

Embodiments of the invention relate generally to multiple imager video systems that produce images through a process of stitching multiple images together.

BACKGROUND

Video/imaging systems may be used to produce video with a wide field-of-view and may be classified as single imager/sensor systems or multiple imager systems. Embodiments of the present invention relate to such video/imaging systems comprising multiple imagers or sensors.

Image stitching is feature common to multiple imager systems that produce images with a wide field-of-view. With image stitching, individual images from the input imagers or sensors are stitched to form a global image that has the required field-of-view.

It is known for imager systems to include a zoom feature used to zoom into particular areas of interest in the resultant global image.

SUMMARY

Embodiments of the present invention, disclose an intelligent zoom method, which advantageously, may be used to determine the left and right extremities in a global image to serve as a left, and right boundary, respectively corresponding to the region of interest for a zoom of function.

In one embodiment, said left and right extremities are set or determined dynamically based on the detection/non-detection of a face in the global image. Advantageously, the left extremity is set to the coordinates for a face in the global image which is determined to be the "left most" face in the global image, and the right extremities set to the coordinates for a face in the global image which is determined to be the "right most" of face in the global image. Thus, advantageously, the area that serves as a region of interest for a zooming function based on said extremities will always contain the faces detected in the global image. This is useful, for example, where an event associated with the global image happens to be a meeting so that a zoom feature may be implemented to effectively zoom into an area of the meeting that includes only the faces of the meeting participants.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
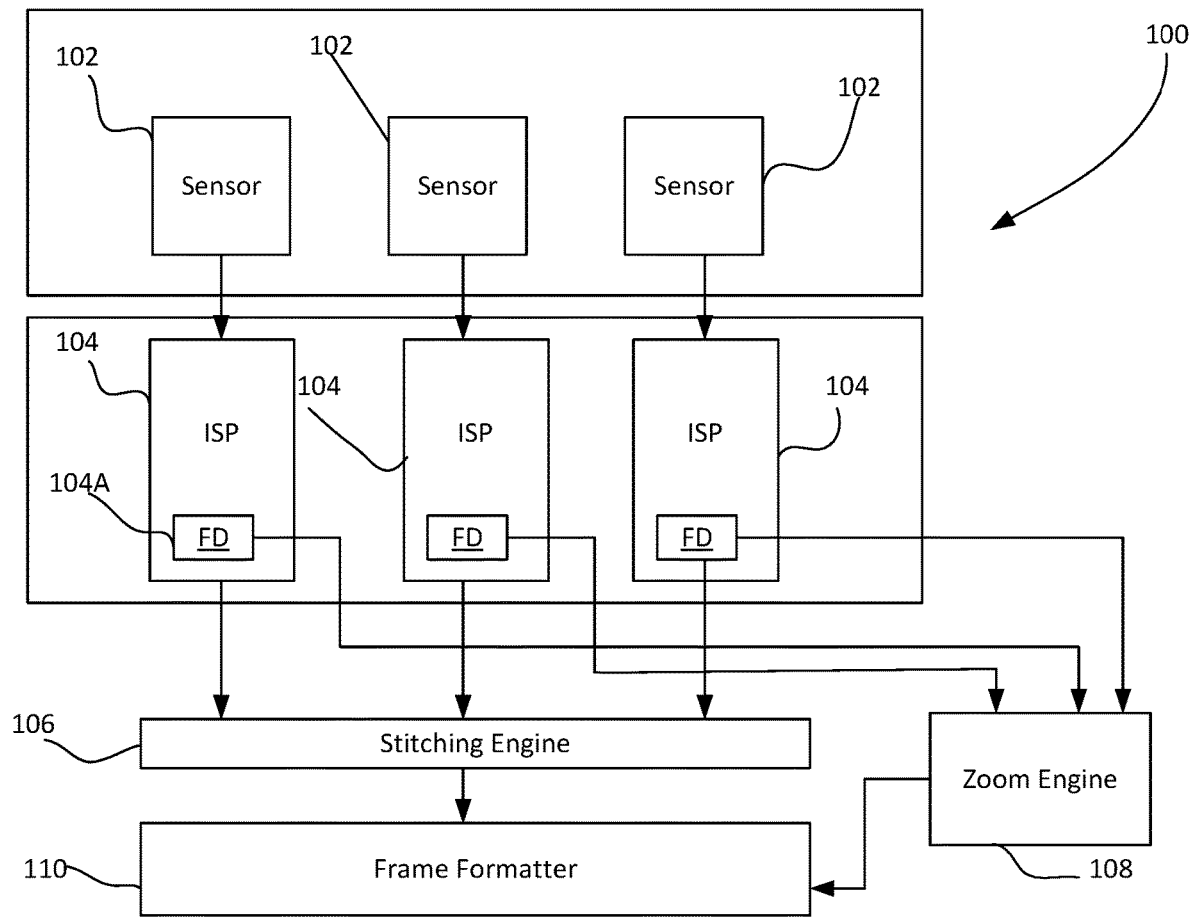
FIG. 1 shows a schematic drawing of hardware for a video camera, in accordance with one embodiment.

FIG. 1 shows a schematic drawing of a hardware 100 for a video camera, in accordance with one embodiment. Advantageously, said video camera is capable of generating a resultant or global image having a wide field-of-view. In some embodiments, said video camera may be capable of generating a panoramic video stream. As will be seen, the hardware 100 includes will a plurality of image sensors indicated by reference numerals 102. The exact number of imaging sensors may vary based on different embodiments of the invention. The image sensors may be configured to capture a raw-images associated with a scene. For purposes of discussing embodiments of the present invention, said scene may be taken to be a meeting, said a boardroom, comprising multiple participants. In one embodiment, the image sensors 102 may comprise CMOS image sensors, for example the AR0330 CMOS that is commercially available from ON Semiconductor.

As will be understood by one of ordinary skill in the art, the geometric arrangement or configuration of the sensors 102 may vary. For example, for panoramic video imaging, the senses may position the along an arc configured to cover field-of-view ranging from between 120° to 360°.

Bayer raw images from the sensors 102 may be output into image signal processors (ISPs) 104. Each ISP may include a face detection engine indicated by reference numeral 104A. As will be appreciated by one of ordinary skill in the art, the ISPs 104 may be configured to perform a variety of image processing functions and/or image enhancements including color format conversion, noise the deduction, etc. to produce an image frame for a selected color-space e.g. RGB, or YUV. The face detection engine 104A may be configured to detect and track faces in an image sequence. In some embodiments, the face detection functionality may be implemented as part of a stitching engine 106. Functionally, the stitching engine 106 may be configured to implement techniques to stitch the images output by each ISP 104 in order to produce a wide field-of-view image.

Figure 2:
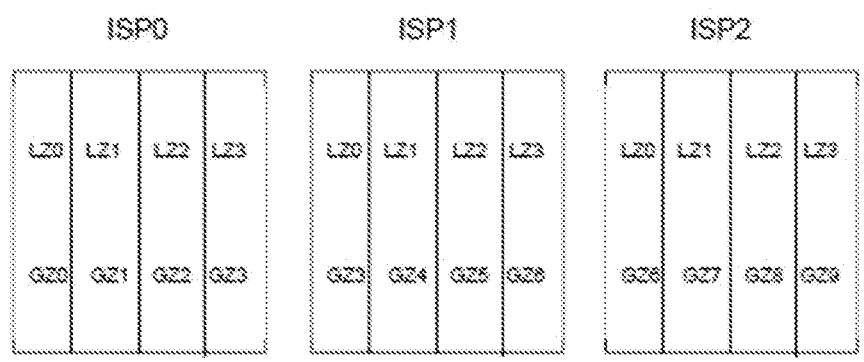
FIG. 2 illustrates a local mapping scheme associated with each sensor, in accordance with one embodiment of the invention.
Figure 3:
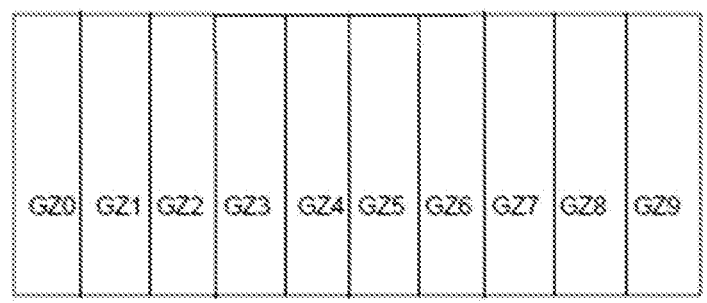
FIG. 3 illustrates a global mapping scheme associated with a global image generated by the video camera, in accordance with one embodiment of the invention.

In one embodiment, in order to perform the intelligent zooming method of the present invention, output by each ISP 104 it divided into local zones which are then mapped to global zones in a global or stitched image. For example, FIG. 2 indicates the local zones in accordance with one embodiment comprising four local zones designated as the LZ0 to LZ3. Each local zone is mapped to a particular global zone designated GZ0 to GZ9. FIG. 3 shows the global zones GZ0 to GZ9 associated with a stitched image.

In one embodiment, the ISPs 104 may be the commercially available the commercially available ISP AP 1302 made by ON Semiconductor.

For purposes of implementing the intelligent zooming method of the present invention, the hardware 100 also includes a zoom engine 108. In one embodiment, the face detection engine 104 may generate a bounding box around a detected face and provides image pixel coordinates of the bounding box. In one embodiment, the zoom engine 108 may be configured to read the bounding box coordinates from all faces detected from an image array. Advantageously, the zoom engine 108 may be configured to calculate a region of interest in the scene being viewed. In one embodiment, based on the region of interest, the zoom engine 108 may compute scaling parameters. In one embodiment, these parameters may include a scaling factor and a starting X coordinate for a stitched image and may program a scalar to produce an image frame which covers only the region of interest. The scaling parameters may be in put into a frame formatter 110 that produces a zoomed image based on said parameters.

Figure 4:
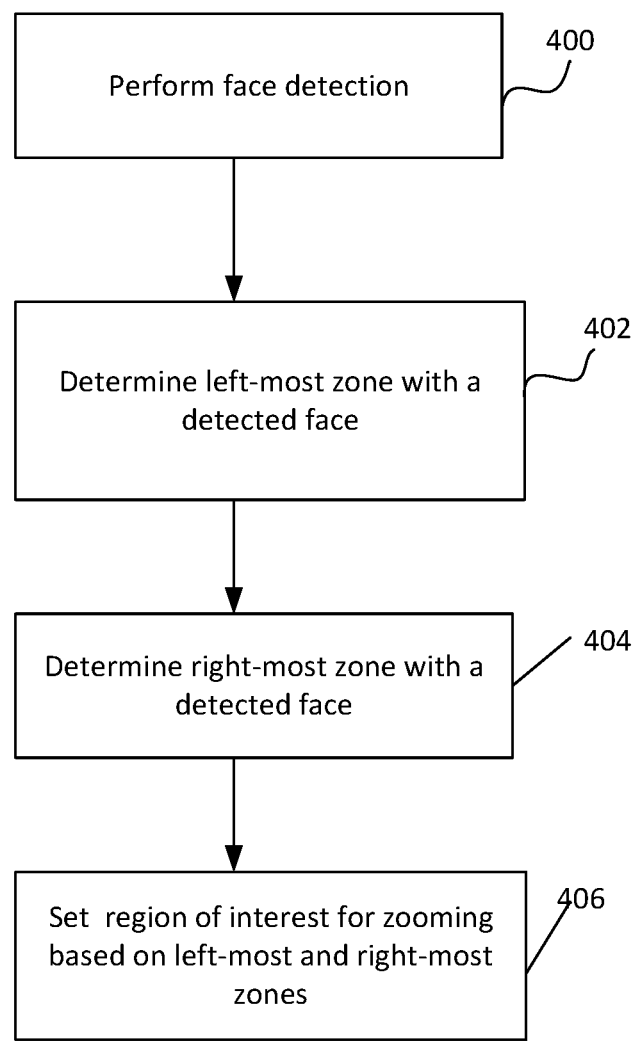
FIG. 4 shows a flowchart of operations for determining a region of interest associated with a zooming function, in accordance with one embodiment of the invention.

FIG. 4 indicates the steps for the intelligent zooming method, in accordance with one embodiment of the invention. Referring to FIG. 4 at block 400, a face detection procedure is performed. The step is performed by the aforementioned face detection engine 104A associated with each ISP 104. At block 402, a left most zoning associated with a detected face is determined. For example, referring to the global image shown in FIG. 3, the left most zone that has a detected face may be the zone GZ2. At block 404, the right most zone with a detected face is determined. Referring again to the global image of FIG. 3, the right most zone with a detected face may be the zone GZ8. At block 406, the zoom engine 108 sets the region of interest for zooming based on the left most and right most zones. In one embodiment, the region of interest is set to have a left most edge corresponding to the coordinates of the detected face in the left most zone, and a right most edge corresponding to the coordinates of the detected faced in the right most zone. Thus, for the example given, the region of interest would begin in the zone GZ2 and in the zone GZ8. As mentioned above, the zoom engine may be configured to calculate scaling parameters associated with the determined region of interest, which are then output to the frame formatter 110, in accordance with one embodiment of the invention.

It has been observed by the inventor, that face detection has a low probability of generating a false positive and a high probability of generating a false negative, a valid face is not detected.

In one embodiment of the invention, a mapping function is implemented as follows: the mapping function is based on the top left coordinates of a rectangle each ISP draws around a detected face. If the mapping function detects a face in a zone, it marks the zone as a true zone, otherwise it marks the zone as a false zone. In other embodiments, other mapping methods may be used. For example, instead of creating zones, the exact pixel coordinates associated with a face may be used to mark pixels as true or false (a pixel's mark is true if it corresponds to a detected face).

In one embodiment, entry and exit criteria may be implemented to mark a local zone as a true zone based on parameters T-enter, and-N-enter, T-exit, and N-exit as follows:

T-enter is the number of consecutive frame in which the face detection function is called to detect faces in a zone.

N-enter is the minimum number of frames in which an active face was detected

T-exit: is the number of consecutive frame in which the face detection function is called to detect no face in zone.

N-exit: is the minimum number of frames in which no active face was detected

Entry Criteria: In time 'T-enter' a face was detected 'N-enter' number of times

Exit Criteria: In time 'T-exit' no face was detected 'N-exit' number of times

T-enter, N-enter, T-exit and N-exit may be configurable parameters

It is assumed that the pipeline is working at 30 frames per second (fps). The parameters scale with the change of frame rate.

In one embodiment, the entry criteria may be configured as follows:

T-enter as 3 sec

N-enter as 90%

Based on the above configuration, in last 90 (3 sec×30 fps) iterations of the mapping function, if a face was detected in at least in 90% of the frames (90% of 3 sec×30 fps; 81 frames with face detection returning positive result) in a particular local zone, then that zone is marked as a True zone.

In one embodiment, the Exit criteria may be configured as follows.

T-exit as 9 sec

N-exit as 99%

Which means that in last 270 (9 sec×30 fps) iterations of the mapping function, if no face was mapped into a local zone at least 99% of frames (99% of 9 sec×30 fps; 267 frames with face detection returning negative result), then the zone is marked as a false-zones.

Detection of a in one embodiment, detection of a face resets the exit criteria counters, similarly detection of exit criteria resets the entry criteria counters. In one embodiment, once the mapping is complete an auto zoom function is called to adjust the zoom and pan levels.

Numerous specific details may be set forth herein to provide a thorough understanding of a number of possible embodiments of a digital imaging system incorporating the present disclosure. It will be understood by those skilled in the art, however, that the embodiments may be practice without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The invention claimed is:

1. A computer-implemented method for implementing a zoom function associated with a video, the method comprising:
    analyzing un-stitched images generated by each of a plurality of imaging sensors for the presence of a face;
    determining a region of interest for the zoom function comprising:
        dividing the un-stitched images into a plurality of zones;
        implementing a mapping function for each of the plurality of zones based on a number of consecutive frames in which the presence of a face was analyzed and a minimum number of frames in which a face was detected;
    setting a left edge for the region of interest to coincide with coordinates associated with a face detected in a left most zone of the un-stitched images;
    setting a right edge for the region of interest to coincide with coordinates associated with a face detected in a right most zone of the un-stitched images.

2. The method of claim 1, further comprising setting scaling parameters based on the region of interest.

3. The method of claim 2, wherein said scaling parameters includes a scaling factor, and a coordinate associated with each of the faces detected in the left most zone and the right most zone.

4. The method of claim 1, wherein said analyzing of the un-stitched images comprises marking the zones of said un-stitched images as true in cases a face is detected therein, and false otherwise based on the mapping function.

5. The method of claim 4, wherein each of the plurality of zones is defined by a rectangular zone.

6. The method of claim 1, wherein said coordinates comprise coordinates associated with a bounding box generated by a face detection engine whenever a face is detected in the un-stitched images.

7. A video system, comprising:
    a plurality of image signal processors, each associated with an imaging sensor;
    an image stitching engine configured to:
        analyze un-stitched images generated by each of a plurality of imaging sensors for the presence of a face;
        divide the unstitched images into a plurality of zones; and
        implement a mapping function for each of the plurality of zones based on a number of consecutive frames in which presence of a face is analyzed and a minimum number of frames in which a face was detected;
    a zoom engine configured to:
        determine a region of interest, wherein said region of interest includes a left edge and a right edge,
        wherein said left edge is set based on coordinates associated with a face detected in a left most zone of the unstitched images, and
        wherein said right edge is set based on coordinates associated with a right most face detected in a right most zone of the unstitched images.

8. The video system of claim 7, further comprising a face detection engine for detecting the left most face and the right most face.

9. The video system of claim 8, wherein the face detection engine maps the plurality of zones of the unstitched images as true whenever a face is detected therein, and false otherwise based on the mapping function.

10. The video system of claim 8, wherein said the plurality of zones comprises rectangular zones associated with the unstitched images generated by each of the imaging sensor.

11. The video system of claim 8, wherein the zoom engine is configured to generate scaling parameters for the region of interest.

12. The video system of claim 11, wherein said scaling parameters comprises a scale factor for the zoom function.

13. The video system of claim 7, wherein said face detection engine is implemented in each of the image signal processor.

* * * * *